United States Patent
Yoshida et al.

(10) Patent No.: US 10,272,780 B2
(45) Date of Patent: Apr. 30, 2019

(54) INFORMATION DISPLAY SYSTEM AND INFORMATION DISPLAY DEVICE

(71) Applicant: MAXELL, LTD., Kyoto (JP)

(72) Inventors: Susumu Yoshida, Tokyo (JP); Kazuhiro Kaizaki, Tokyo (JP)

(73) Assignee: MAXELL, LTD., Kyoto (JP)

( * ) Notice: Subject to any disclaimer, the term of this patent is extended or adjusted under 35 U.S.C. 154(b) by 237 days.

(21) Appl. No.: 14/891,417

(22) PCT Filed: Sep. 13, 2013

(86) PCT No.: PCT/JP2013/074793
§ 371 (c)(1),
(2) Date: Nov. 16, 2015

(87) PCT Pub. No.: WO2015/037117
PCT Pub. Date: Mar. 19, 2015

(65) Prior Publication Data
US 2016/0082840 A1    Mar. 24, 2016

(51) Int. Cl.
*B60K 35/00*    (2006.01)
*B60Q 9/00*    (2006.01)
*B60R 1/00*    (2006.01)

(52) U.S. Cl.
CPC .............. *B60K 35/00* (2013.01); *B60Q 9/008* (2013.01); *B60R 1/00* (2013.01); *B60K 2350/1084* (2013.01); *B60K 2350/352* (2013.01); *B60K 2350/962* (2013.01); *B60R 2300/205* (2013.01); *B60R 2300/308* (2013.01)

(58) Field of Classification Search
None
See application file for complete search history.

(56) References Cited

U.S. PATENT DOCUMENTS

| | | | |
|---|---|---|---|
| 7,400,233 B2 | 7/2008 | Kondo | |
| 2004/0207260 A1* | 10/2004 | Hattori | G05B 19/042 307/9.1 |
| 2007/0106475 A1* | 5/2007 | Kondoh | B60K 26/021 701/301 |
| 2009/0160736 A1 | 6/2009 | Shikita | |
| 2009/0189753 A1 | 7/2009 | Enya et al. | |

(Continued)

FOREIGN PATENT DOCUMENTS

| | | |
|---|---|---|
| JP | 08-175228 A | 7/1996 |
| JP | 2006-327527 A | 12/2006 |

(Continued)

*Primary Examiner* — Jelani A Smith
*Assistant Examiner* — Kelly D Williams
(74) *Attorney, Agent, or Firm* — Volpe and Koenig, P.C.

(57) ABSTRACT

There is provided an information display system for supporting a high safety driving, so that a driver can clearly recognize an obstacle. A shape of a virtual image indicating an outline or a frame line of the obstacle is changed according to a risk level of the obstacle against a vehicle, and a display position of the virtual image is adjusted according to a viewpoint position of the driver, so that a deviation in displaying between an actual obstacle and the virtual image is suppressed. In addition, there is provided an information display system which can make the driver intuitively recognize the obstacle without hindering the driving by displaying an estimated traffic line of the obstacle as the virtual image.

12 Claims, 11 Drawing Sheets

(56) References Cited

U.S. PATENT DOCUMENTS

| | | |
|---|---|---|
| 2011/0187844 A1 | 8/2011 | Ogawa et al. |
| 2012/0224060 A1* | 9/2012 | Gurevich .................. B60R 1/00 348/148 |
| 2014/0003620 A1* | 1/2014 | Rill ......................... G06F 3/165 381/86 |

FOREIGN PATENT DOCUMENTS

| | | |
|---|---|---|
| JP | 2006-350934 A | 12/2006 |
| JP | 2008-062762 A | 3/2008 |
| JP | 2008-193339 A | 8/2008 |
| JP | 2009-150947 A | 7/2009 |
| JP | 2009-196630 A | 9/2009 |
| JP | 2010-073032 A | 4/2010 |
| JP | 2010-143411 A | 7/2010 |
| JP | 2011-119917 A | 6/2011 |
| JP | 2012-069154 A | 4/2012 |
| JP | 2012-212351 A | 11/2012 |

\* cited by examiner

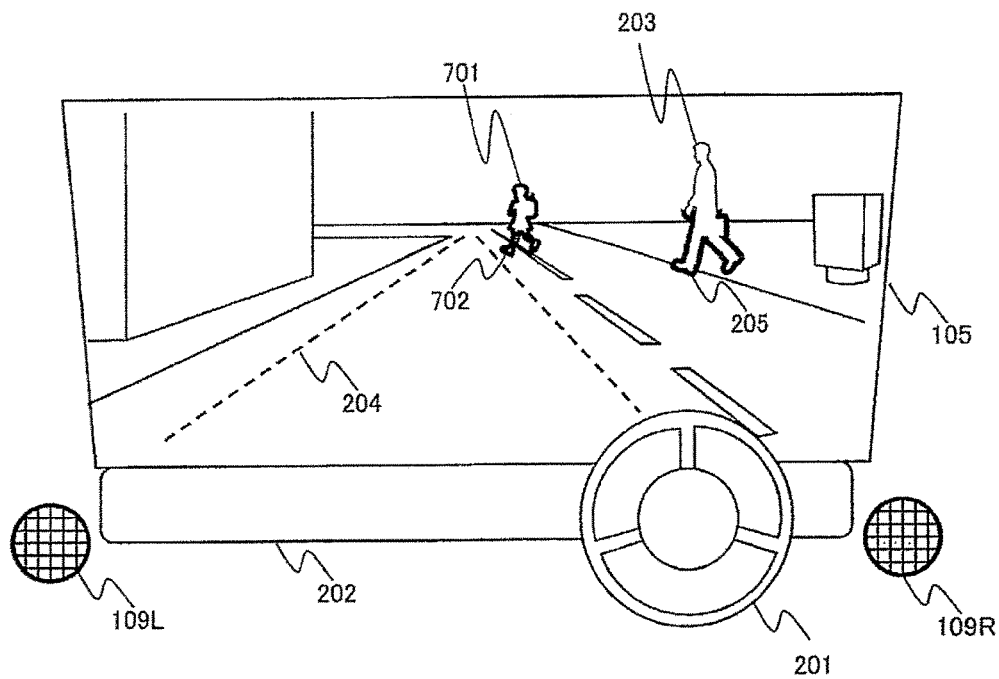
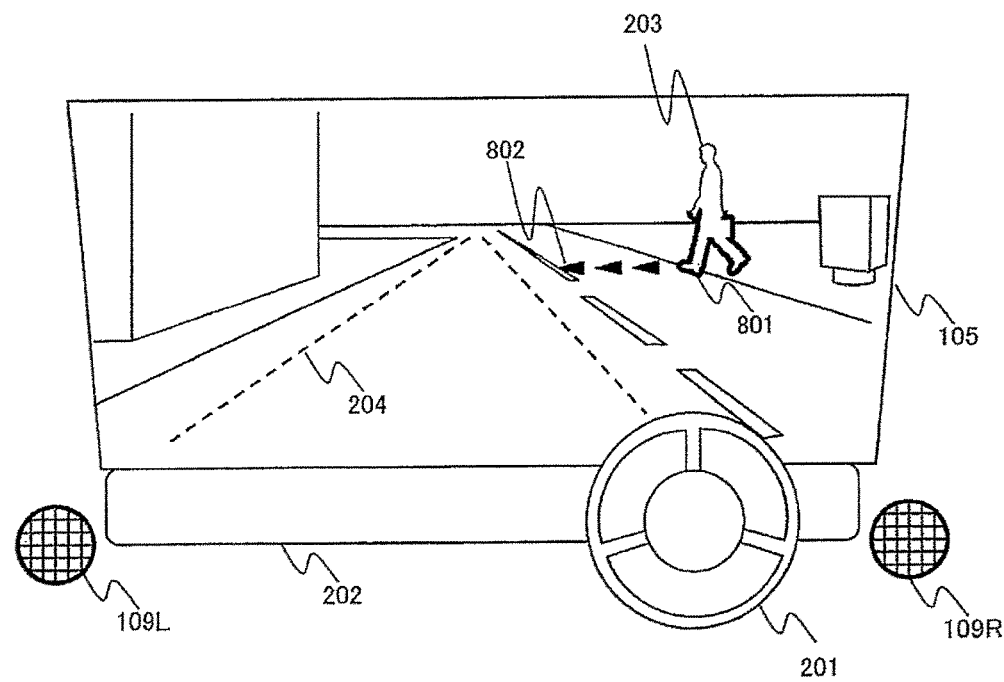

INFORMATION DISPLAY SYSTEM AND INFORMATION DISPLAY DEVICE

TECHNICAL FIELD

The present invention relates to an information display system and an information display device to support driving of an automobile.

BACKGROUND ART

As a method of supporting the driving by providing auxiliary information on the driving to a driver of an automobile, a car navigation system is generally used for displaying path information in a several-inch-sized display provided near the center of an instrument panel (dash board). Furthermore, there is known a method using a head up display (hereinafter, referred to as HUD) which projects a predetermined image (virtual image) as information for supporting the driving and avoiding a risk in addition to the path information onto a front window shield glass (hereinafter, referred to as a front shield) or a reflection plate (referred to as a combiner) of a half mirror provided in the front shield as a screen in order to avoid that the safety is lowered when the driver turns his/her eyes.

As the related art, for example, Patent Document 1 discloses a technique in which information for supporting the driving or avoiding the risk is acquired and notified to the driver using the HUD. The publication discloses a method of detecting the information of a distance and a direction of an obstacle outside a vehicle (normally the front side) using a laser radar, a millimeter wave radar, a stereo camera, or the like, and determining the obstacle by an image recognition. In addition, disclosed is a display device which is provided with "a virtual image control unit which displays the virtual image such that the virtual image moves onto a path surrounding the obstacle when viewed from the driver in a case where the risk level set by the risk level setting unit is in a predetermined range, and changes a display method of the virtual image according to the risk level (see claim 1 etc.).

In addition, Patent Document 2 has an object to provide "a vehicle head up display which can short a time taken for turning the eyes of the driver by changing a display distance of the virtual image, and achieve a high safety preventing an accident in advance". Regarding the object, there is the description "the vehicle head up display includes a light source, a scanning unit which performs a two-dimensional scanning using the light from the light source, a screen which forms the scanning light, and a projection unit which projects a video on the screen. A movable mechanism which changes a position of the screen is provided" (see Abstract).

RELATED ART DOCUMENTS

Patent Documents

Patent Document 1: Japanese Patent Application Laid-Open No. 2009-196630
Patent Document 2: Japanese Patent Application Laid-Open No. 2009-150947

SUMMARY OF THE INVENTION

Problems to be Solved by the Invention

According to the related art, in the method of displaying information for supporting the driving or avoiding the risk using the HUD, a warning is issued to the driver by displaying the virtual image to move onto the path surrounding the obstacle. However, in the method, the virtual image does not have a form of the obstacle, so that the driver may not instantly recognize the obstacle. In addition, in the method, there is no consideration for the handling of a plurality of obstacles or for the display type of the obstacle recognized as an individual moving body.

In addition, in a case where the HUD is used, when the virtual image is displayed in the front shield or the combiner provided in a shape along the front shield, the visibility may be easily influenced by an external factor such as brightness. Particularly, the related art also fails to consider a method of reducing the influence of the external factor while securing the easy recognition of the obstacle.

Furthermore, there is no consideration for a method of notifying the obstacle, which is outside the field of view over the front shield and may cause an influence on the running vehicle, to the driver using the HUD.

The present invention has been made in view of these problems, and an object thereof is to provide an information display system which supports the driving of the automobile and with which the driver is easily and safely notified without hindering the driving.

Means for Solving the Problems

The problems, for example, are improved by the inventions described in claims.

Effects of the Invention

According to the invention, it is possible to suppress that support information hinders the driving in a driving support of the vehicle such as an automobile, so that the safety of the driver can be improved.

BRIEF DESCRIPTIONS OF THE DRAWINGS

FIG. 1 is a diagram schematically illustrating an embodiment of an information display system.
FIG. 2 is a diagram illustrating an example of a virtual image display of an obstacle in a first embodiment.
FIG. 3 is a diagram illustrating an example of a virtual image display in a case where a risk level of an obstacle in the first embodiment is different.
FIG. 4 is a flowchart illustrating an operation in the first embodiment.
FIG. 5 is a diagram illustrating an example of a virtual image display of an obstacle in a second embodiment.
FIG. 6 is a diagram illustrating an example of a virtual image display in a case where a risk level of an obstacle in the second embodiment is different.
FIG. 7 is a diagram illustrating an example of a virtual image display of a plurality of obstacles.
FIG. 8 is a diagram illustrating an example of a virtual image display of an obstacle in a third embodiment.
FIG. 9 is a diagram illustrating an example of a virtual image display in a case where an advancing direction of an obstacle is different in the third embodiment.
FIG. 10 is a flowchart illustrating an operation in the third embodiment.
FIG. 11 is a flowchart illustrating an operation in a fourth embodiment.
FIG. 12 is a diagram illustrating an example of a virtual image display of an obstacle in the fourth embodiment.

DETAILED DESCRIPTION OF PREFERRED EMBODIMENTS

Hereinafter, embodiments of the invention will be described using the drawings.

First Embodiment

Figure 1:
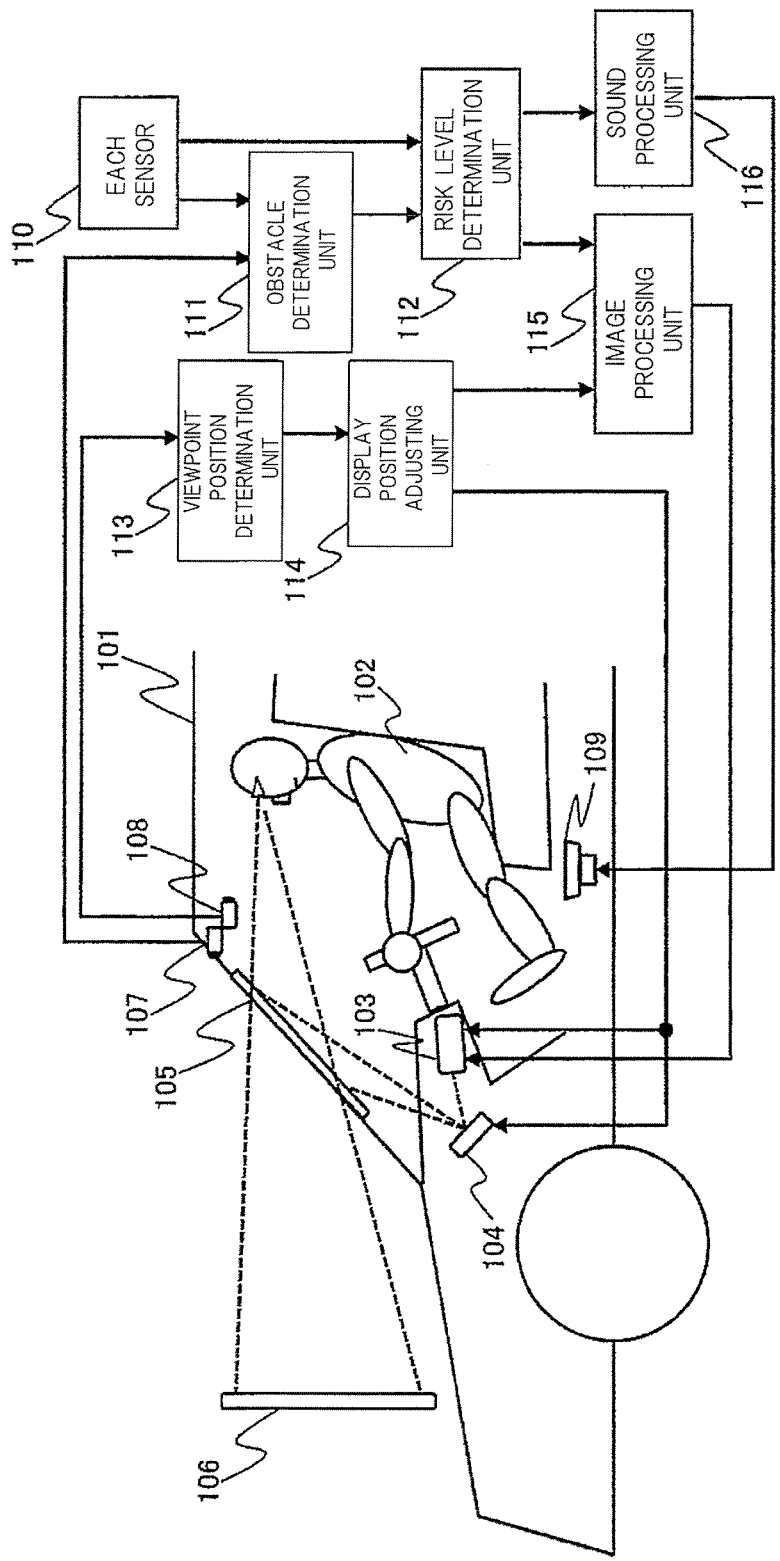

FIG. 1 is a diagram schematically illustrating a first embodiment of an information display device (or an information display system; hereinafter, referred to as the information display system for convenience' sake) according to the invention. The reference number 101 represents a vehicle, the reference number 102 represents a driver, the reference number 103 represents a projection unit, the reference number 104 represents a mirror, the reference number 105 represents a combiner, the reference number 106 represents a virtual image plane, the reference number 107 represents a front camera which picks up the front side, the reference number 108 represents a driver camera which picks up the driver, the reference number 109 represents a speaker, the reference number 110 represents each in-vehicle sensor such as a laser radar and a speed sensor, the reference number 111 represents an obstacle determination unit, the reference number 112 represents a risk level determination unit, the reference number 113 represents a viewpoint position determination unit, the reference number 114 represents a display position adjusting unit, the reference number 115 represents an image processing unit, and the reference number 116 represents a sound processing unit. Further, in the following embodiment, the description will be made about a configuration in which the combiner 105 is used as a screen, and a virtual image may be projected using a front shield as a screen.

Auxiliary information on the driving is projected as a virtual image from the projection unit 103, reflected on the mirror 104, and projected to the combiner 105. The driver 102 recognizes the projected virtual image that is overlapped with an external field of view over the front shield, as the virtual image plane 106. In the projection unit 103, a MEMS (Micro Electro Mechanical Systems) mirror may be used as a scanning unit, or an aspheric concave mirror may be used as the mirror 104. Herein, a detailed description on some appropriate methods of projecting the virtual image will not be given (for example, see Patent Document 2).

Figure 4:
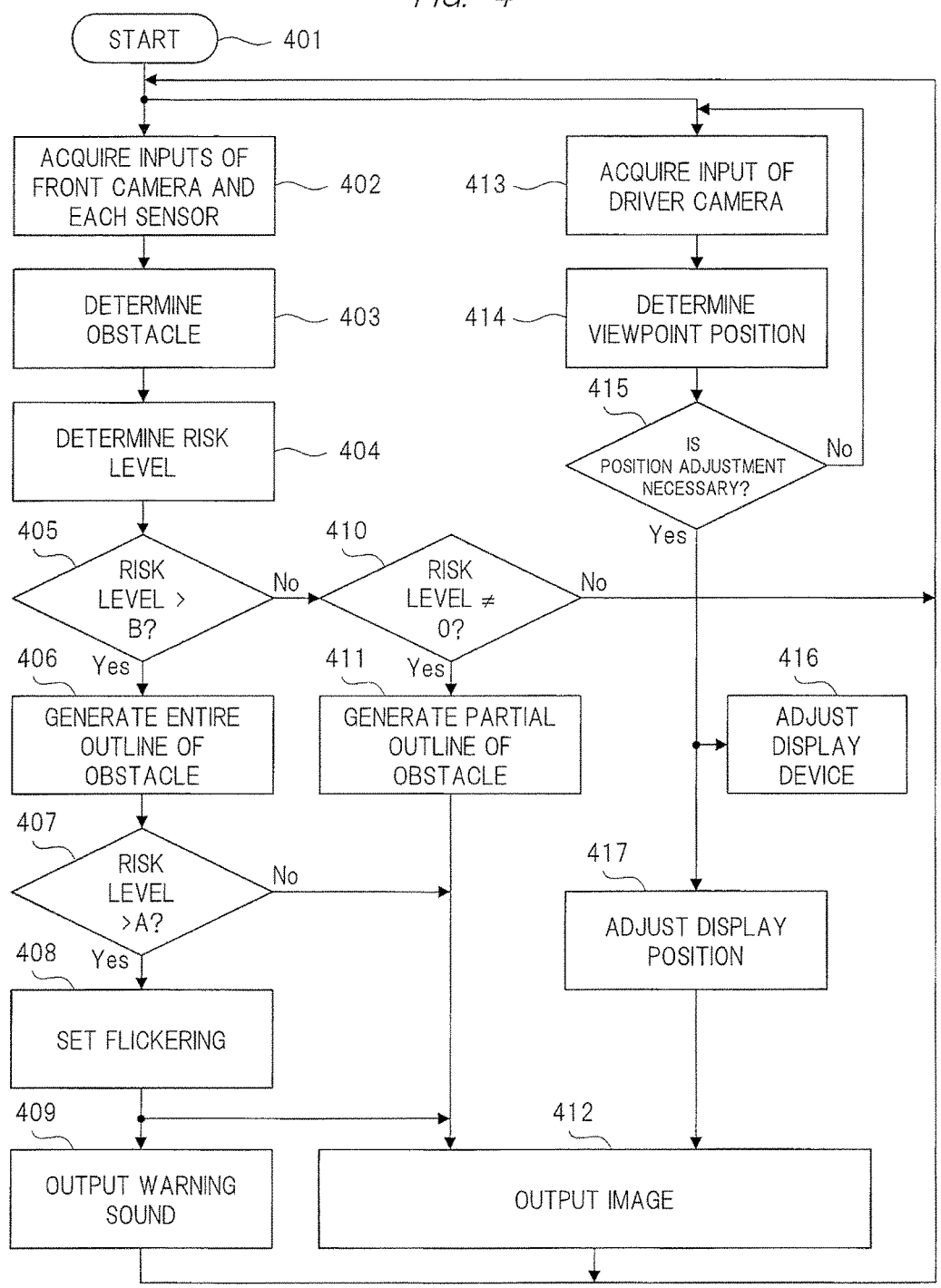

Here, an information display process of the information display system in FIG. 1 will be described using the flowchart of an operation of FIG. 4. First, the process starts when the engine of the vehicle 101 is activated or the driver 102 performs an activation instructing operation (401). The activation instructing operation of the driver may be performed through a touch panel in a display provided near the center of the instrument panel described above, or may be performed by a dedicated activation switch. An image in front of the vehicle 101 is picked up by the front camera 107, and a plurality pieces of information is acquired by each in-vehicle sensor 110 such as a laser radar and a speed sensor (402). The obstacle determination unit 111 determines an obstacle as a person, a bicycle, a motorcycle, an automobile, or others based on the acquired image and the information (403). Furthermore, the risk level determination unit 112 determines a risk level of the obstacle based on the determination result on the obstacle and the information acquired from the speed sensor 110 (404).

For the determination on the obstacle, a well-known technique may be used as a method using an image recognition technique. In addition, for example, the determination on the risk level may be made from a distance up to the obstacle and speed information of the vehicle 101 as disclosed in Patent Document 1, or the risk level of the obstacle may be determined among a plurality of risk levels by estimating an advancing direction of the obstacle. Herein, the risk level is expressed by a value from 0 (the lowest risk level) to 100 (the highest risk level), and a risk level D of the obstacle is determined. For example, assuming A. and B as thresholds (A>B), the risk level D can be estimated to fall within any one of the following ranges. (1) D>A: the vehicle may come into collision with the obstacle when the current speed is maintained, that is, the obstacle is on a traffic line of the vehicle. (2) A≥D>B: the vehicle will not come into collision with the obstacle at this current speed, but the vehicle will pass by the obstacle in a close distance (for example, 2 m or less). (3) B≥D>0: the vehicle is out of a distance closest to the obstacle at the current speed. (4) D=0: there is no risk level of the obstacle.

On the basis of the above ranges, first, it is determined whether the risk level corresponds to D>B (405). In a case where the risk level corresponds to D>B, the image processing unit 115 generates an entire outline of the obstacle as image data of the virtual image (406). Next, it is determined whether the risk level corresponds to D>A (407). In a case where the risk level corresponds to D>A, a flickering setting of the virtual image is performed (408). In a case where the risk level does not correspond to D>A, the flickering setting of the virtual image is not performed. On the other hand, in a case where the risk level does not correspond to D>B in Step 405, it is subsequently determined whether the risk level corresponds to D≠0 (410). In a case where the risk level corresponds to D≠0, the image processing unit 115 generates a partial outline of the obstacle (for example, only the lower half part) as the image data of the virtual image. In a case where the risk level does not correspond to D≠0 (D=0), the process just returns to Step 402. In a case where the image data of the virtual image is generated, the image processing unit 115 outputs the image data to the projection unit 103 (412). In addition, in a case where it is determined that the risk level corresponds to D>A in Step 407, a warning sound is also output from the sound processing unit 116 to the speaker 109 (409). Further, the virtual image may be generated at any position in the image data (referred to as an image plane) which can be displayed in full size in the combiner 105 output from the image processing unit 115 to be overlapped with the actual obstacle. In particular, a relation between the obstacle and an estimated traffic line of the vehicle is also reflected on the determination on the risk level in Step 404, and the estimated vehicle traffic line (corresponding to a width of the vehicle) may also be generated and displayed on the image plane in synchronization with the virtual image of the obstacle as a virtual image depicted with a broken line.

On the other hand, after the process starts in Step 401, the driver camera 108 picks up an image around the face of the driver, and acquires information required for the determination of the viewpoint position of the driver (413). The viewpoint position determination unit 113 determines the viewpoint position of the driver using the acquired information (414), and determines whether there is a need to perform a position adjustment for a virtual image display (415). Specifically, for example, an optimal positional relation of the viewpoint position with respect to the projection unit 103 and the mirror 104 is stored, and it is determined whether there is a need to perform the position adjustment of the projection unit 103, the mirror 104, or both of them according to a deviation of the viewpoint position. In a case where the position adjustment is required, the position adjustment of the display device such as the position of the projection unit 103 and a rotational angle of the mirror 104 is adjusted based on the instruction of the display position adjusting unit 114 as described above (416). In addition, in a case where only a minute adjustment is required for the display position of the virtual image in the image plane, or in a case where the display position of the virtual image needs to be adjusted according to the position adjustment of the display device, the display position adjusting unit 114 performs a process such that information for the position adjustment is reflected on the image data output of the generated virtual image (417).

Next, the front scene which is projected on the combiner 105 and viewed by the driver 102 through the above processes will be described using FIGS. 2 and 3.

Figure 2:
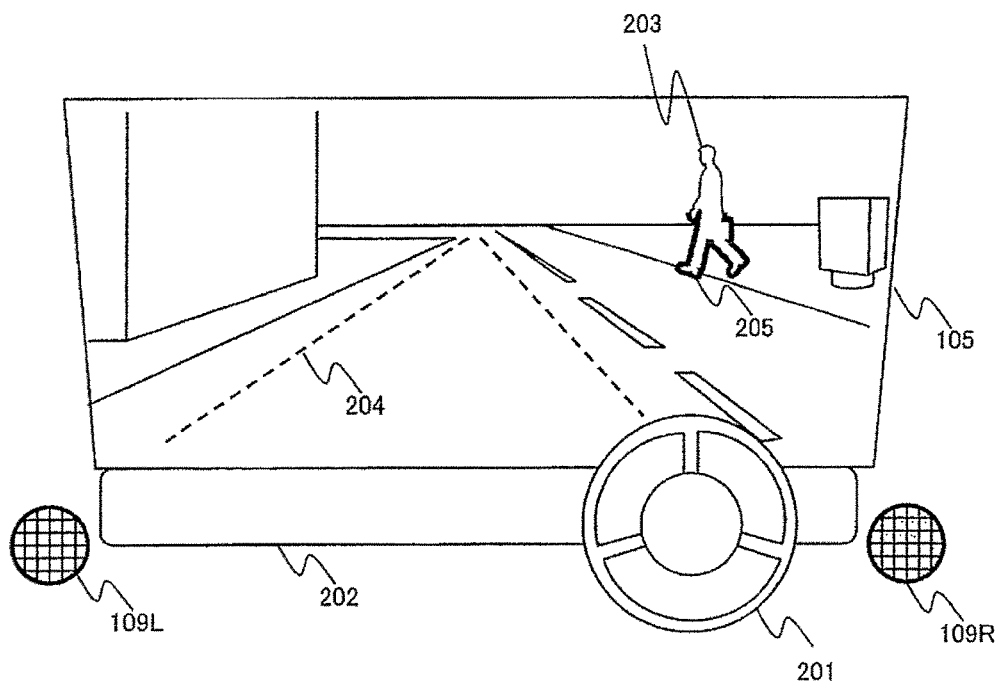

FIG. 2 is a diagram illustrating an example in a case where the risk level corresponds to the range of (3) B≥D>0 and the virtual image of the obstacle is generated and displayed. The components used in FIG. 1 will be denoted by the same symbols, and the reference number 105 is the combiner, the scene displayed in the range is the front scene viewed by the driver 102 (the same will be applied hereinafter). The reference number 201 represents a steering, the reference number 202 represents an instrument panel, the reference number 203 represents an obstacle (a pedestrian in this case), the reference number 204 represents a virtual image of the estimated vehicle traffic line, the reference number 205 represents the generated virtual image of the obstacle, the reference number 109L represents a left speaker, and the reference number 109R represents a right speaker.

In this case, the virtual image 205 is generated and displayed as a partial outline of only a lower half of an obstacle 203. The driver 102 can recognize at least a lower half of the pedestrian (that is, feet of pedestrian) and thus the safety can be secured. Further, since an unnecessary virtual image display is not performed in a state where the risk level is not high, the displayed information does not hinder the driving.

Figure 3:
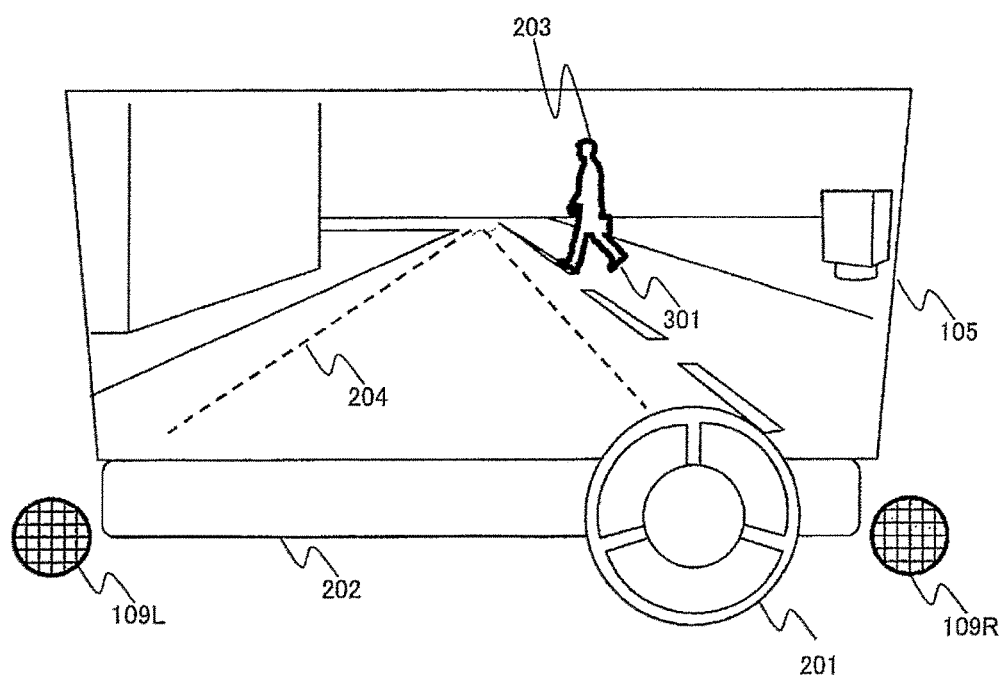

FIG. 3 is a diagram for describing an example of the virtual image display of the obstacle in a case where the risk level corresponds to the range of (2) A≥D>B or (1) D>A. The components used in FIG. 2 will be denoted by the same symbols, and the description thereof will not be repeated. The reference number 301 represents the generated virtual image.

First, the virtual image display in a case where it is determined that the risk level corresponds to (2) A≥D>B will be described. The virtual image 301 is displayed as an entire outline of the obstacle 203. In a state where the risk level is high to some degrees, the driver 102 can clearly recognize the pedestrian, and does not miss the pedestrian even in a split-second determination.

In addition, the virtual image display in a case where it is determined that the risk level corresponds to (1) D>A will be described. The reason why the explanation can be made using the same figure in the case of (2) A≥D>B is that even when a relative position to the estimated vehicle traffic line 204 of the obstacle 203 is the same, the result of the determination on the risk level may be different according to a speed of the vehicle, the advancing direction of the pedestrian, a distance, and other conditions. In FIG. 3, the virtual image 301 is displayed as an entire outline of the obstacle 203 as described above. Furthermore, in this case, as a risk level with the highest level, the virtual image 301 is flicked, and the warning sound is output from the left speaker 109L and the right speaker 109R. In the state where the risk level is the highest, the driver 102 can clearly recognize the obstacle by the virtual image, the flickering thereof, and the sound, and can take an action for avoiding the collision with the obstacle 203.

As described above, according to the first embodiment of the invention, it is possible to provide an information display system for supporting a safe driving without hindering the driving by changing the displaying ratio of the outline according to the risk level of the obstacle, so that the driver can clearly recognize the obstacle. Since the display position of the virtual image is adjusted according to a viewpoint of the driver, there occurs no deviation in the display positions of the obstacle and the virtual image.

Second Embodiment

Next, a second embodiment of the information display system according to the invention will be described as another example of the virtual image display using FIGS. 5 and 6. Since the respective processes based on the flowchart of FIG. 4 are the same as those of FIGS. 2 and 3, so that the detailed description thereof will not be repeated.

Figure 5:
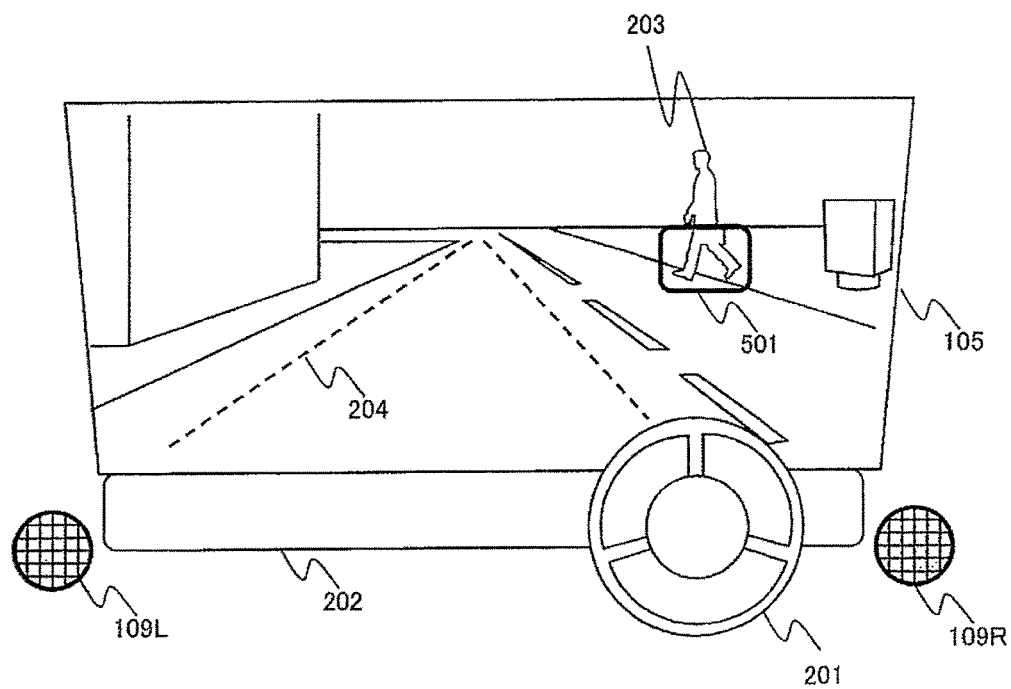

FIG. 5 is a diagram illustrating another example in a case where the risk level corresponds to the range of (3) B≥D>0, and the virtual image of the obstacle 203 is generated and displayed. The components used in FIG. 2 will be denoted by the same symbols, and the detailed description thereof will not be repeated. The reference number 501 represents the generated virtual image.

The shape of the virtual image 501 is different from that of FIG. 2, and in this case, the virtual image 501 illustrates a lower half of the obstacle 203, but is generated and displayed by a frame line instead of the partial outline. Similarly to the case of FIG. 2, the driver 102 can recognize at least a lower half of the pedestrian and the safety can be secured. Further, since an unnecessary virtual image display is not performed in a state where the risk level is not high, the displayed information does not hinder the driving. In addition, even in a case where a plurality of obstacles are overlapped, or the outline of the obstacle 203 is not clearly picked up by the front camera 107 under all the conditions, the position of the obstacle 203 can be recognized as the virtual image 501 in a large frame.

Figure 6:
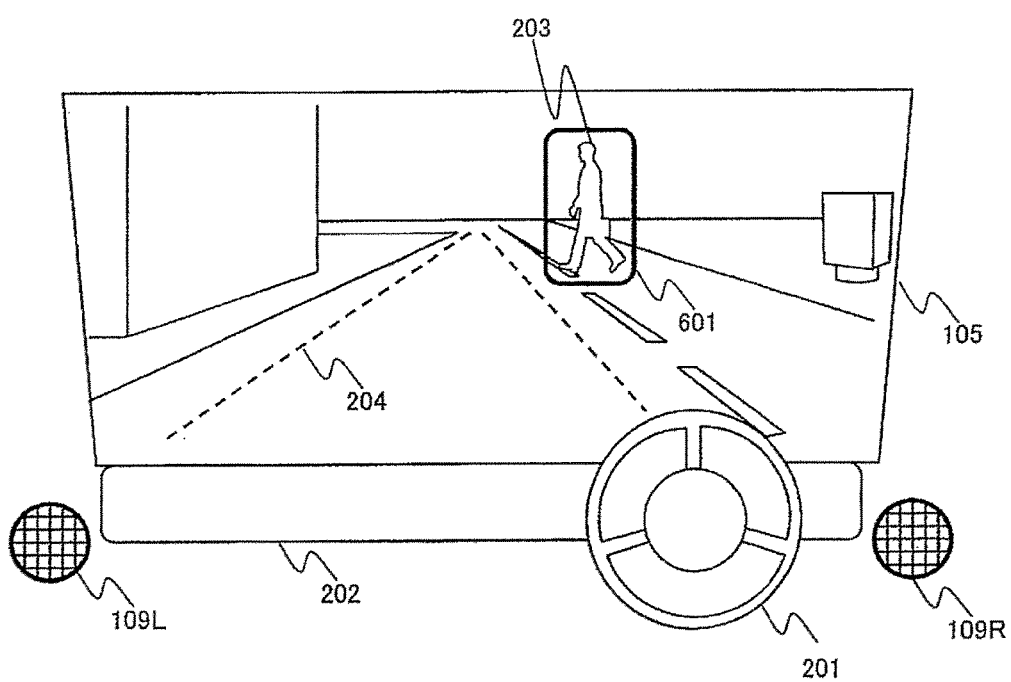

FIG. 6 is a diagram for describing another example of the virtual image display of the obstacle in a case where the risk level corresponds to the range of (2) A≥D>B or (1) D>A. The components used in FIG. 3 will be denoted by the same symbols, and the description thereof will not be repeated. The reference number 601 represents the generated virtual image.

First, the virtual image display in a case where it is determined that the risk level corresponds to (2) A≥D>B will be described. The virtual image 601 is displayed by a frame line surrounding the entire obstacle 203. Similarly to the case of FIG. 3, the driver 102 can clearly recognize the pedestrian in a state where the risk level is high to some degrees, and does not miss the obstacle even in a split-second determination.

In addition, the virtual image display in a case where it is determined that the risk level corresponds to (1) D>A will be described. The reason why the explanation can be made using the figure in the case of (2) A≤D>B is the same as that of the case of FIG. 3. In FIG. 6, the virtual image 601 is displayed as a frame line surrounding the entire obstacle 203 as described above. Furthermore, in this case as a risk level with the highest level, the virtual image 601 is flicked, and the warning sound is output from the left speaker 109L and the right speaker 109R. Similarly to the case of FIG. 3, in a state where the risk level is the highest, the driver 102 can clearly recognize the obstacle by the virtual image, the flickering thereof, and the sound, and can take an action for avoiding the collision with the obstacle. In addition, as described above, even in a case where a plurality of obstacles are overlapped, or the outline of the obstacle 203 is not clearly picked up by the front camera 107 under all the conditions, the position of the obstacle 203 can be recognized as the virtual image 601 in a large frame.

Here, the description will be made using FIG. 7 about an example of the virtual image display in a case where the method of the virtual image display in FIGS. 2 and 3 is applied in a state where the obstacles are positioned at distant places. Further, the components used in FIG. 2 will be denoted by the same symbols, and the description thereof will not be repeated. The reference number 701 represents an obstacle (pedestrian) different from the obstacle 203, and the reference number 702 represents the virtual image generated for the obstacle 701.

In FIG. 7, as described above, since the risk level corresponds to the range of (3) B≥D>0, the virtual image 205 of the obstacle 203 is generated and displayed only as a partial outline of only a lower half of the obstacle 203. On the contrary, in a case where it is determined that the risk level corresponds to (2) A≥D>B, the virtual image 702 of the obstacle 701 is generated and displayed as an entire outline of the obstacle 701. Even in a case where there are a plurality of obstacles, the driver 102 can intuitively recognize the risk level how the outline is attached, so that the safety in the driving can be secured. Further, since an unnecessary virtual image display is not performed, the displayed information does not hinder the driving.

As described above, according to the second embodiment of the invention, it is possible to provide an information display system for supporting the driving without hindering the driving by changing the displaying ratio of the frame line according to the risk level of the obstacle, so that the driver can clearly recognize the obstacle even in a case where there are the plurality of obstacles or the outline of the obstacle is not clear.

In addition to the above embodiment, a color tone and a line width of the virtual image may be differently changed while the risk level is changed from (1) to (3) as another embodiment. For example, in the embodiment described in FIG. 7, the driver 102 can more intuitively recognize the obstacle by configuring the color tones of the virtual images 205 and 702 to be changed from a bluish color to a reddish color as the risk level is increased.

Third Embodiment

Next, a third embodiment of the information display system according to the invention will be described using FIGS. 8 to 10. Further, the configuration of the information display system is the same as that illustrated in FIG. 1, and thus the description will be made using the reference numbers denoted to the components of FIG. 1.

Figure 10:
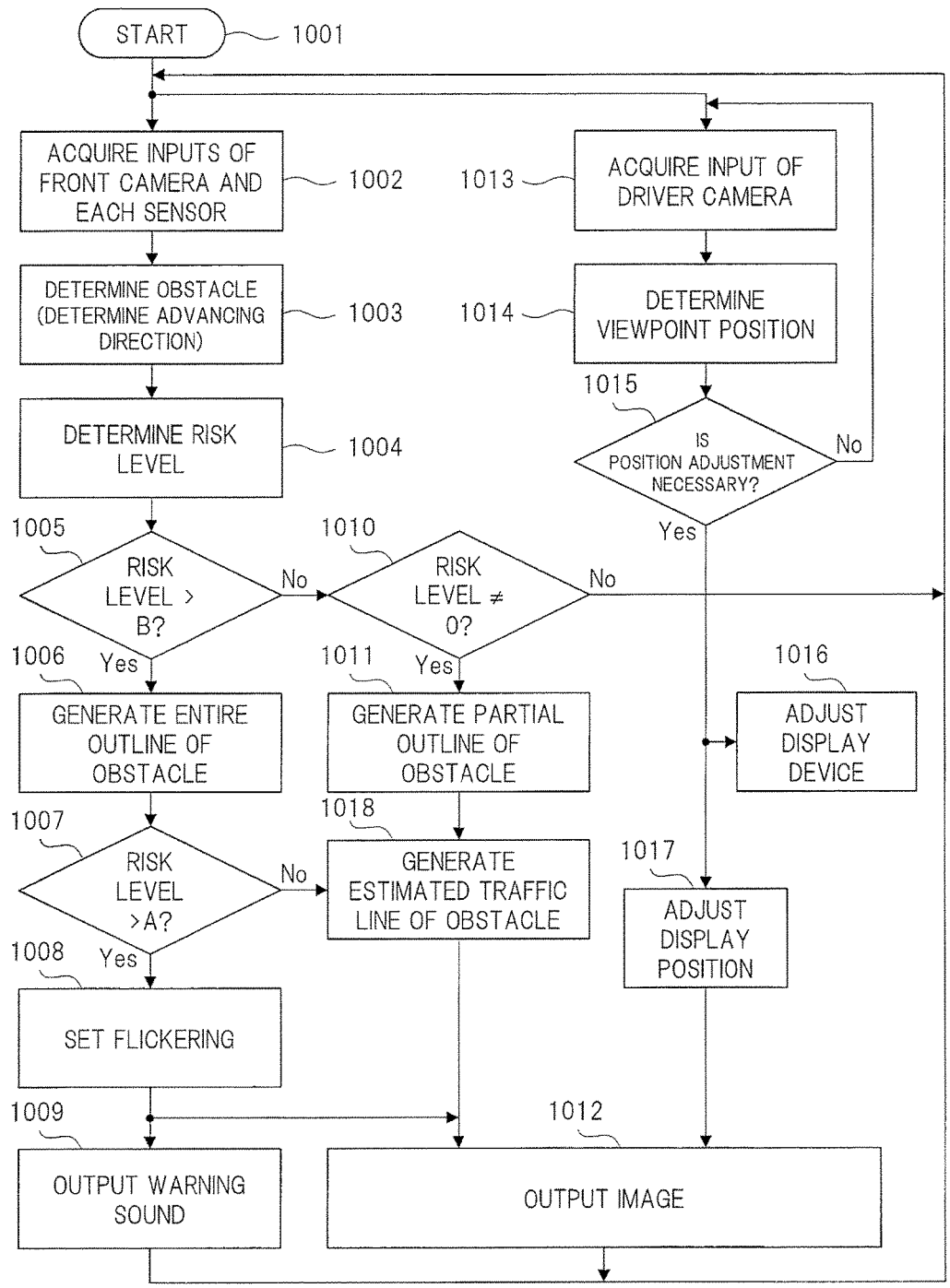

FIG. 10 is a diagram illustrating an operation flow of this embodiment. First, the process starts when the engine of the vehicle 101 is activated or the driver 102 performs the activation instructing operation (1001). Similarly to the embodiment described above, the activation instructing operation of the driver may be performed through a touch panel in a display provided near the center of the instrument panel, or may be performed by a dedicated activation switch. An image in front of the vehicle 101 is picked up by the front camera 107, and a plurality pieces of information is acquired by each in-vehicle sensor 110 such as a laser radar and a speed sensor (1002). The obstacle determination unit 111 determines an obstacle as a person, a bicycle, a motorcycle, an automobile, or others based on the acquired image and the information (1003). Even in the embodiment described above, in the determination on the risk level based on the determination on the obstacle, the addition of the estimation of the advancing direction of the obstacle has been described, and in this embodiment, the advancing direction and the speed of the obstacle are explicitly determined in the determination (1003) of the obstacle. The risk level determination unit 112 determines a risk Level of the obstacle based on the determination result including the shape, the advancing direction, and the speed of the obstacle, and information acquired from the speed sensor (1004).

The determination on the shape of the obstacle is performed by a method using the above-mentioned image recognition technique, and in addition, the advancing direction and the speed of the obstacle are estimated by storing the moving image data picked up by the front camera 107 every several seconds. The determination on the risk level is synthetically made including the distance to the obstacle, the speed information of the vehicle 101, the shape of the obstacle, the advancing direction, and the estimated speed of the obstacle. Herein, similarly to the embodiment described above, the description has been made about a case where the process is changed according to the ranges (1) to (4) to which the risk level D corresponds by the thresholds A and B, and the third embodiment is different from the embodiments described above in that the estimation information on the advancing direction and the estimated speed of the obstacle is reflected on the generated virtual image in addition to the risk level.

First, it is determined whether the risk level corresponds to D>B (1005). In a case where the risk level corresponds to D>B, the image processing unit 115 generates an entire outline of the obstacle as the image data of the virtual image (1006). Next, it is determined whether the risk level corresponds to D>A (1007). In a case where the risk level corresponds to D>A, the flickering setting of the virtual image is performed (1008). In a case where the risk level does not correspond to D>A, the flickering setting of the virtual image is not performed. On the other hand, in a case where the risk level does not correspond to D>B in Step 1005, it is determined whether the risk level corresponds to D≠0 (1010). In a case where the risk level corresponds to D≠0, the image processing unit 115 generates a partial outline of the obstacle as the image data of the virtual image by reflecting the advancing direction of the obstacle. For example, in a case where the obstacle moves in a direction to the estimated vehicle traffic line, only a lower half is processed as the partial outline. In a case where the obstacle moves in a reverse direction to the estimated vehicle traffic line, only a lower ⅓ part is processed as the partial outline. In a case where the risk level does not correspond to D≠0 (D=0), the process just returns to Step 1002.

Next, the image processing unit 115 generates an estimated traffic line of the obstacle as the virtual image based on the advancing direction of the obstacle and the estimated speed information in addition to the entire or partial outline of the obstacle (1018). The image date of the generated outline of the obstacle, and the image data of the virtual image of the estimated traffic line are output to the projection unit 103 by the image processing unit 115 (1012). In addition, in a case where the risk level corresponds to D>A in Step 1007, the warning sound output is also output from the sound processing unit 116 to the speaker 109 (1009). Further, the virtual image may be generated at any position in the image plane similarly to the embodiments described above to be overlapped with the actual obstacle, and the virtual image of the estimated vehicle traffic line may also be displayed.

On the other hand, after the process starts in Step 1001, the viewpoint position of the driver is determined based on the input from the driver camera 108 and the position adjustment of the virtual image is performed. The operations of Steps 1013 to 1017 are the same as those of Steps 413 to 417 in FIG. 4, and thus the detailed description thereof will not be repeated.

Next, the front scene which is projected on the combiner 105 and viewed by the driver 102 through the above processes will be described using FIGS. 8 and 9.

FIG. 8 is a diagram illustrating an example of a virtual image display of the obstacle in a case where the risk level corresponds to the range of (3) B≥D>0 and the obstacle advances in a direction to the estimated vehicle traffic line. The components used in FIG. 2 will be denoted by the same symbols, and the description thereof will not be repeated. The reference number 801 represents the generated virtual image of the obstacle, and the reference number 802 represents the virtual image indicating the estimated traffic line of the obstacle.

In this case, since the obstacle 203 is advancing in a direction to the estimated vehicle traffic line 204, the virtual image 801 is generated and displayed as the partial outline of only a lower half of the obstacle 203, similarly to the case of the first embodiment. In addition, the virtual image 802 is displayed as a plurality of marks as the estimated traffic line of the obstacle 203 at a position indicating the advancing direction. The number of marks displayed as the virtual image 802 may be determined as a predetermined number according to whether the obstacle 203 is advancing in a direction to the estimated vehicle traffic line 204, or may be increased or decreased according to the estimated speed of the obstacle 203. Since the driver 102 can recognize the lower half of the pedestrian (that is, feet of pedestrian) as the outline, and also visually capture the estimated traffic line, the safety can be more secured. Further, since the unnecessary virtual image display is not performed according to the risk level, the displayed information does not hinder the driving.

Figure 9:
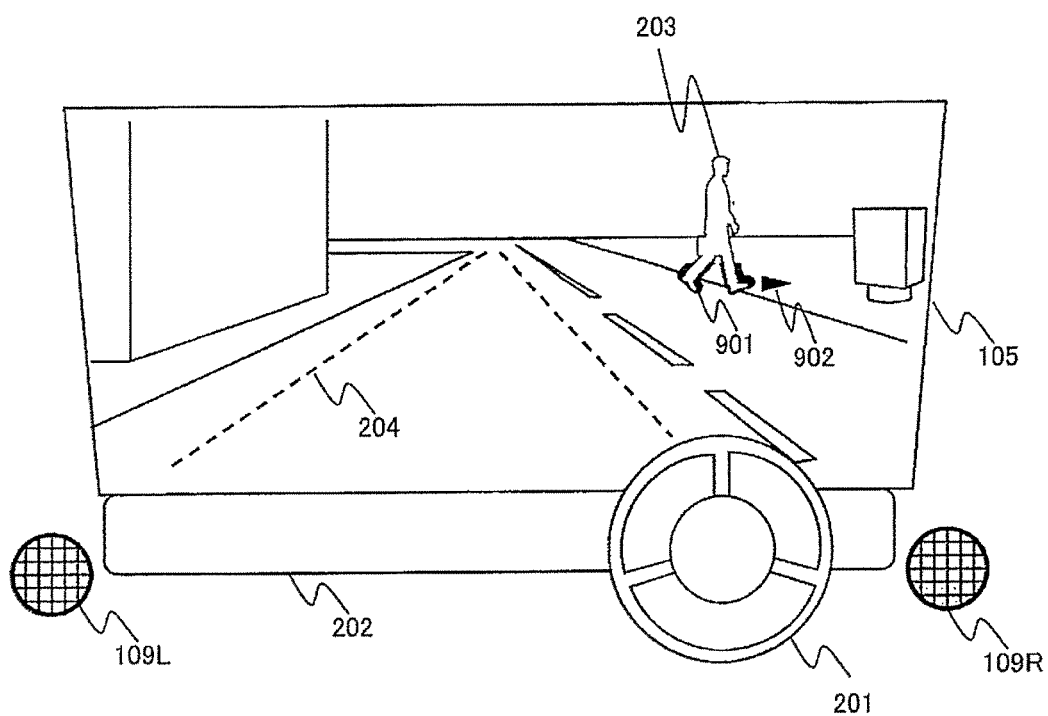

FIG. 9 is a diagram illustrating an example of the virtual image display of the obstacle in a case where the risk level corresponds to (3) similarly to the case of FIG. 8, but the obstacle is advancing in a direction away from the estimated vehicle traffic line. The components used in FIG. 2 will be denoted by the same symbols, and the description thereof will not be repeated. The reference number 901 represents the generated virtual image of the obstacle, and the reference number 902 represents the virtual image indicating the estimated traffic line of the obstacle.

In this case, since the obstacle 203 is advancing in a direction away from the estimated vehicle traffic line 204, the virtual image 901 is generated and displayed as the partial outline of only a lower ⅕ part of the obstacle 203. In addition, the virtual image 902 is displayed by a single mark at a position indicating the advancing direction as the estimated traffic line of the obstacle 203. The number of marks displayed as the virtual image 902 may be increased or decreased according to the estimated speed of the obstacle 203 similarly to the case of FIG. 8, but since the obstacle 203 is advancing in a direction away from the estimated vehicle traffic line 204, it does not bother the driver 102 when only the advancing direction is displayed as a signal mark. Since the driver 102 can recognize the feet of the pedestrian as the outline and also visually capture the estimated traffic line, the obstacle and the situation thereof can be exactly recognized. Further, since the unnecessary virtual image display is not performed according to the risk level, the displayed information does not hinder the driving.

Further, in this embodiment, the description has been made about a case where the risk level corresponds to (3) B≥D>0 in FIGS. 8 and 9, but the present embodiment can be applied even to the case where the risk level corresponds to (2) A≥D>B and (1) D>A similarly to the first embodiment. However, in a case where the risk level is high, the entire outline of the obstacle is displayed as the virtual image to make the driver easily recognize for sure regardless of whether the obstacle is advancing in a direction to the estimated vehicle traffic line or a direction away therefrom. In addition, instead of displaying the outline of the obstacle as the virtual image, the size of the frame line of the obstacle may be changed as described in the second embodiment, and may be combined with the virtual image display of the estimated traffic line of the obstacle. Further, the description in FIGS. 8 and 9 has been made about an example in which the virtual image display is changed in a case where the advancing direction of the obstacle is different in the same risk level of (3) B≥D>0, but it is also possible that the risk level determination unit 112 operates using another risk level in a case where the advancing direction of the obstacle is different from that from the very beginning. In addition, in this embodiment, the description has been made about a case where the estimated traffic line of the obstacle is displayed by the plurality of marks indicating the advancing direction of the obstacle. The shape of the estimated traffic line may be displayed by simply changing the length of a straight line or an arrow having a width according to the advancing direction or the speed of the obstacle, and is not particularly limited as long as the estimated traffic line can be displayed.

As described above, according to the third embodiment of the invention, it is possible to provide an information display system for supporting the driving, with which the driver can intuitively recognize the obstacle without hindering the driving by displaying the estimated traffic line of the obstacle in addition to the display of the virtual image of the obstacle.

Fourth Embodiment

Next, a fourth embodiment of the information display system according to the invention will be described using FIGS. 11 and 12. In this embodiment, the description will be made about an example of the virtual image display of the obstacle in a case where the front visibility of the driver is lowered due to an external factor (for example, backlight). Further, since the configuration as the information display system is the same as that illustrated in FIG. 1, the description thereof will be made using the symbols attached to the components of FIG. 1.

Figure 11:
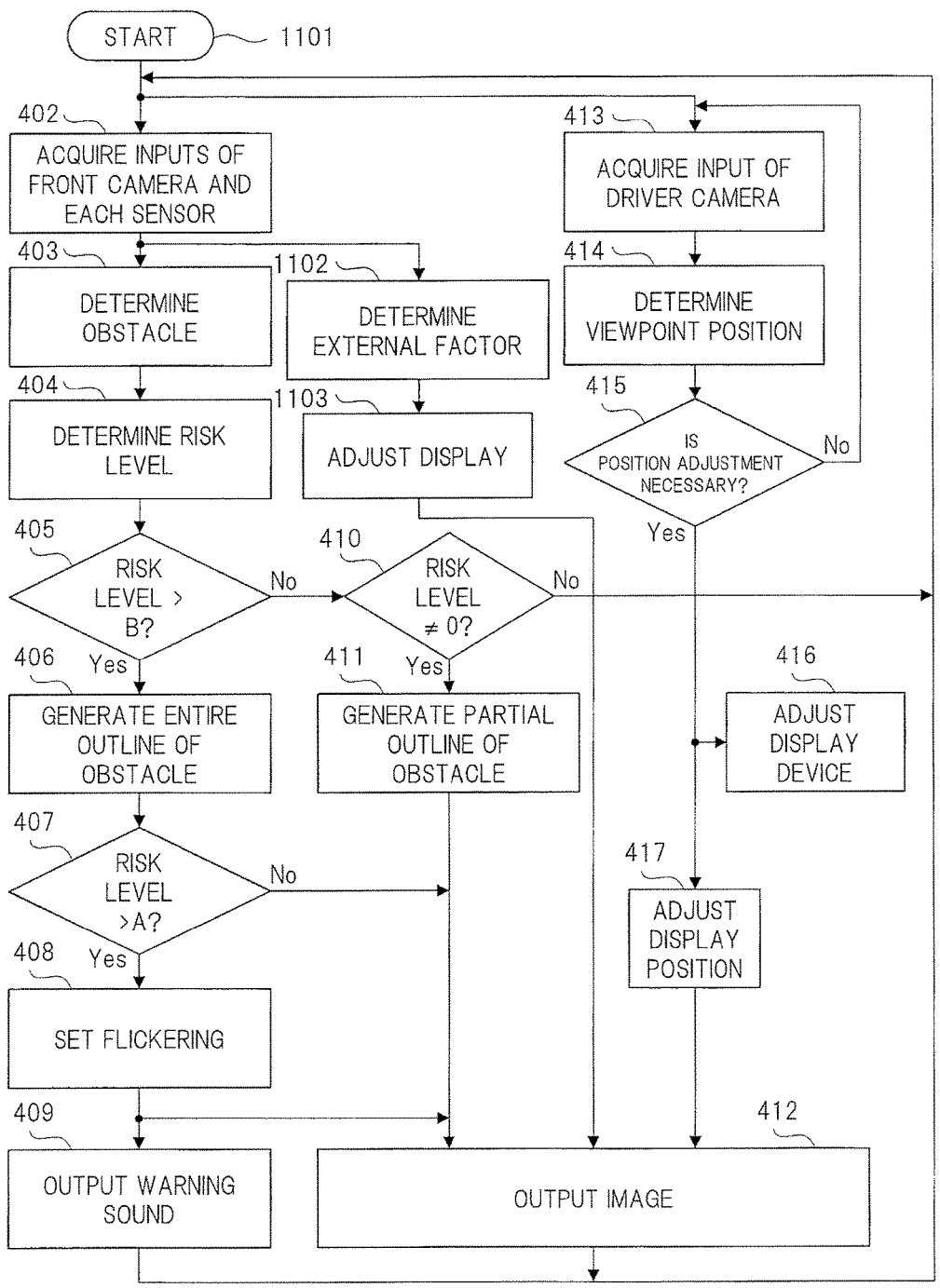

FIG. 11 is a diagram illustrating an operation flow of this embodiment. Since the operation flow is formed by adding steps to the flow of FIG. 4 or 10, the steps not described herein will be the same as those of the operations described above. In addition, FIG. 11 is formed by adding the steps to FIG. 4 for the sake of simplicity, but the same steps may be added to FIG. 10.

First, the process starts when the engine of the vehicle 101 is activated or the driver 102 performs the activation instructing operation (1101). Similarly to the embodiment described above, the activation instructing operation of the driver may be performed through a touch panel in a display provided near the center of the instrument panel, or may be performed by a dedicated activation switch. The information acquired by the front camera 107 or each in-vehicle sensor 110 such as a laser radar is determined whether it has the external factor (1102). The determination on the external factor may be included as one of the risk level determinations as the operation of the risk level determination unit 112, or may be made by a single processing unit. When the external factor (for example, the backlight) is recognized, a process of adjusting a brightness of the virtual image is performed in the image processing unit 115 (1103). The virtual image (the entire outline, the partial outline) of the obstacle generated in Step 406 or 411, and the virtual image of the estimated vehicle traffic line are reflected with the above adjustment by the image processing unit 115 and output to the projection unit 103 (1104). Further, the backlight can be determined by a visual light camera, and the obstacle can be determined by integrally determining the backlight using a laser radar or an infrared camera as each in-vehicle sensor 110 even in this case.

Figure 12:
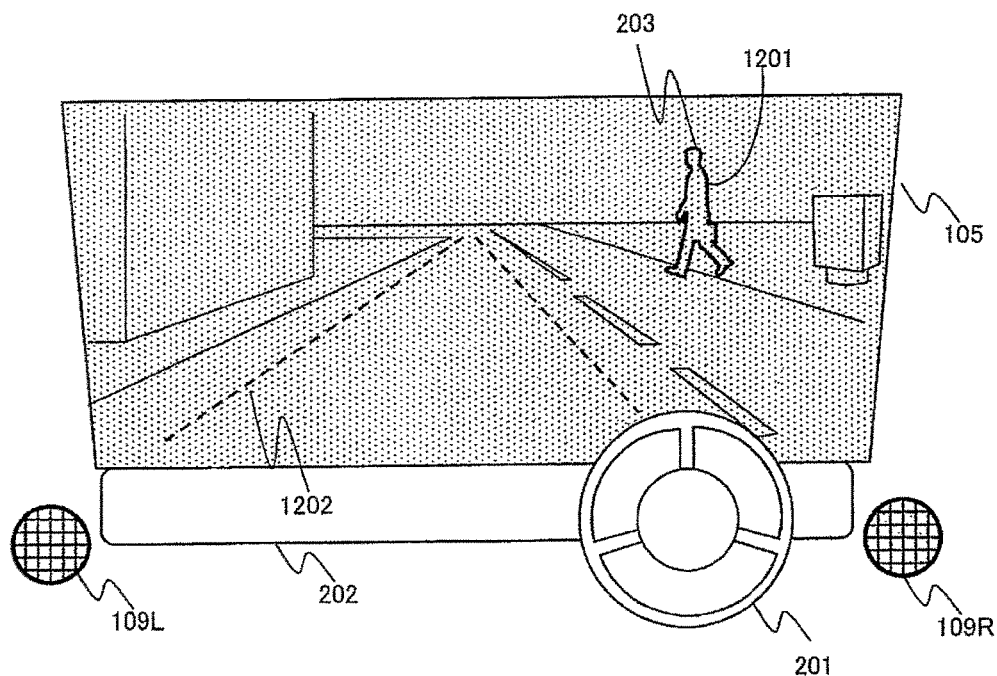

FIG. 12 is a diagram illustrating an example of the front scene which is projected to the combiner 105 through the above processes and viewed by the driver 102. The components used in FIG. 2 will be denoted by the same symbols, and the detailed description thereof will not be repeated. The reference number 1201 represents the virtual image of the obstacle 203, and the reference number 1202 represents the virtual image of the estimated vehicle traffic line. In addition, a case where the risk level of the obstacle corresponds to (3) B≥D>0 is illustrated.

The luminance in a direction to the front shield (that is, the entire combiner 105) becomes extremely high due to the backlight, and the visibility of the external field including the obstacle 203 is lowered. In this case, the virtual image 1201 and the virtual image 1202 are temporarily displayed in a state where the brightness is lowered (a color near black). In addition, in the embodiment described above, the description has been made such that the virtual image of the obstacle is displayed by a lower half of the outline in a case where the risk level corresponds to (3). However, in a case where the influence of the external factor is received, the obstacle is displayed by an entire outline regardless of the risk level. Even in the circumstance of the backlight, the driver 102 can recognize at least the obstacle 203 and the estimated vehicle traffic line 1202, so that the safety can be secured even under the influence of the external factor.

In addition, as a modification example of this embodiment, the brightness of a portion other than the virtual image in the image plane may be adjusted instead of adjusting the brightness of the virtual image in Step 1103. The entire portion other than the virtual image, or the light source of the backlight is recognized, and the virtual image having temporarily lowered the brightness is generated and displayed in the portion. In this case, the virtual image is displayed so as not to block the visibility by making a pixel interval of the virtual image rough, so that the safety can be secured.

In this embodiment, the description has been made about a case where the risk level of the obstacle corresponds to (3) B≥D>0, but the risk level is not limited thereto. Even in any case described in the embodiments, the external factor can be processed. In addition, the description has been made about the case of the backlight as the external factor, but this embodiment may be applied even in a case where the front visibility is lowered due to an environment factor such as rain, snow, or fog, and a time zone changing from twilight to night time. For example, in a case where the luminance of the image data acquired by the front camera 107 is low, the virtual images of the obstacle and the estimated vehicle traffic line are also displayed by adjusting the luminance.

As described above, according to the fourth embodiment of the invention, it is possible to provide an information display system with a high safety which can make the driver recognize the obstacle by adjusting the display of the virtual image even in a case where the visibility is lowered in the virtual image display of the obstacle due to the external factor.

Fifth Embodiment

Next, a fifth embodiment of the information display system according to the invention will be described using FIGS. 13 and 14. In this embodiment, the description will be made about an example of the virtual image display in which a warning on the obstacle outside a front field of view over the front shield is notified to the driver. Further, since the configuration as the information display system is the same as that illustrated in FIG. 1, the description will be made using the symbols attached to the components of FIG. 1.

Figure 13:
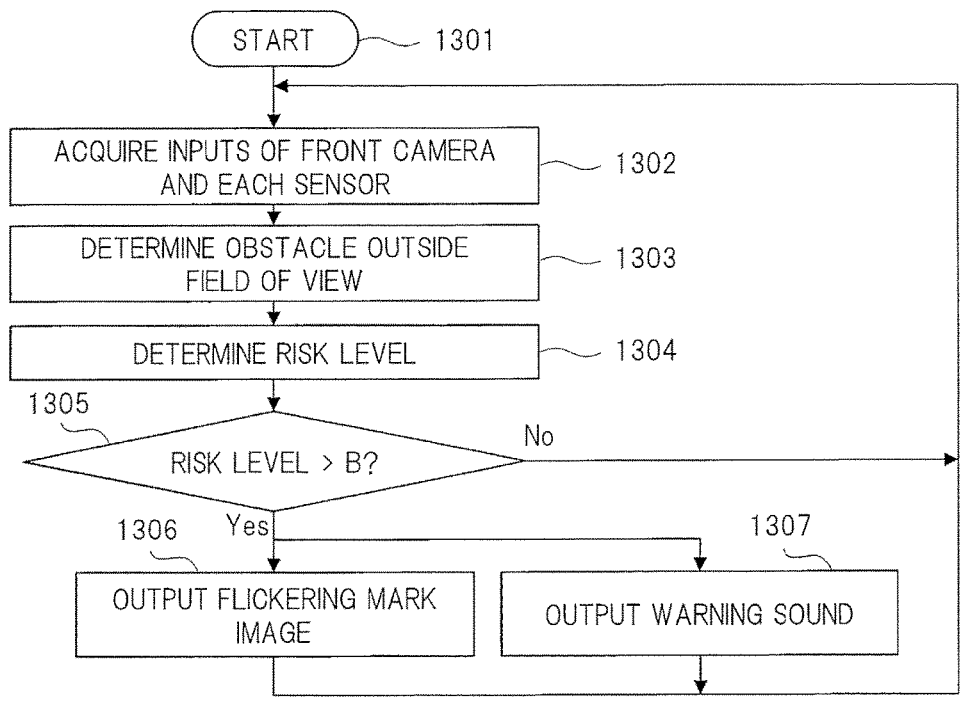
FIG. 13 is a flowchart illustrating an operation in a fifth embodiment.

FIG. 13 is a diagram illustrating an operation flow of this embodiment. Although the operation flow can be added to any of FIGS. 4, 10, and 11, it will be described as a single operation flow for the sake of explanation.

First, the process starts when the engine of the vehicle 101 is activated or the driver 102 performs the activation instructing operation (1301). Similarly to the embodiment described above, the activation instructing operation of the driver may be performed through a touch panel in a display provided near the center of the instrument panel, or may be performed by a dedicated activation switch. Information based on the front side of the vehicle is acquired by the front camera 107 and each in-vehicle sensor 110 such as a laser radar (1302). For example, the laser radar can acquire information of a wider range than the front field of view over the front shield, and it is possible to capture an obstacle outside the front field of view by a side camera of the vehicle included as one of the in-vehicle sensors. Similarly to the embodiment described above, the obstacle determination unit 111 determines the shape, the advancing direction, and the speed of the obstacle outside the front field of view (1303). In addition, similarly, the risk level determination unit 112 determines the risk level of the obstacle outside the front field of view using the determination result based on the information acquired from the speed sensor (1304). It is determined whether the risk level is 0 (1305), and in a case where the risk level is 0, the process returns to Step 1302. In a case where the risk level is not 0, the image processing unit 115 generates a mark as the virtual image for warning the driver, and outputs the mark to the projection unit 103 (1306). At this time, a display position of the mark is set to be a position near the obstacle in the image plane. In a case where the risk level is not 0, the warning sound is output from the sound processing unit 116 to the speaker 109 at the same time when the virtual image is displayed (1307). At this time, the sound and the image are localized such that the warning sound is output from the left speaker in a case where the obstacle is on the left side outside the front field of view, and the warning sound is output from the right speaker in a case where the obstacle is on the right side outside the front field of view.

Figure 14:
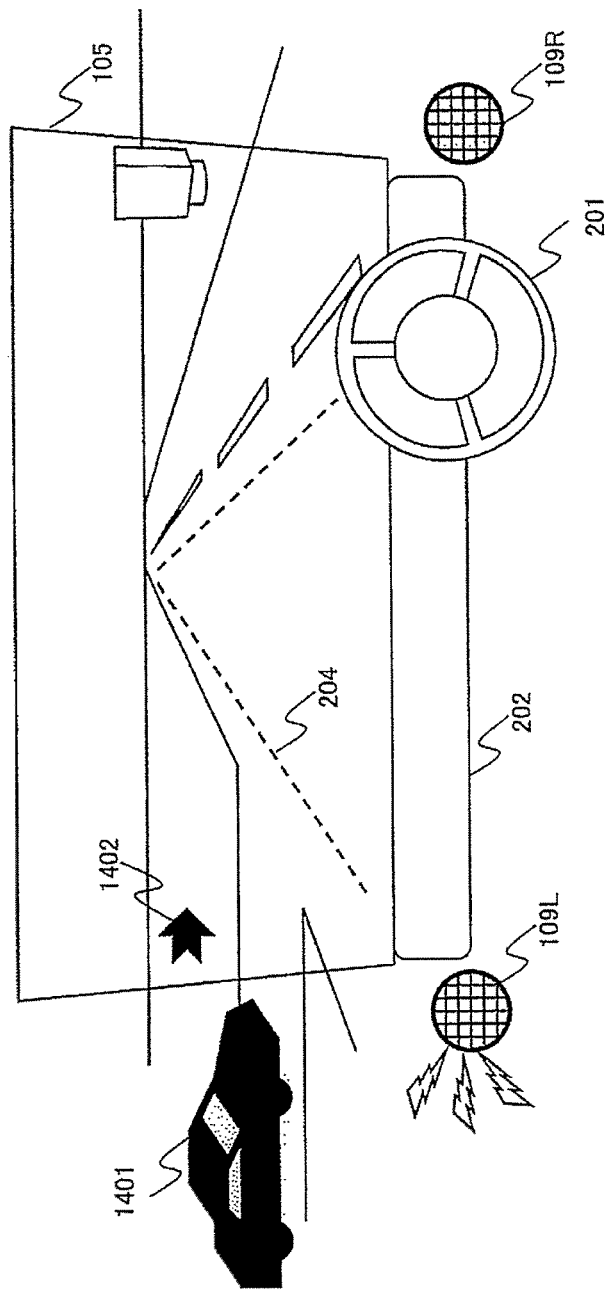
FIG. 14 is a diagram illustrating an example of a warning mark display and a warning sound output in the fifth embodiment.

FIG. 14 is a diagram illustrating an example of the front scene which is projected on the combiner 105 through the above processes and viewed by the driver 102, and displaying the obstacle (automobile) outside the front field of view. The components used in FIG. 2 will be denoted by the same symbols, and the detailed description thereof will not be repeated. The reference number 1401 represents the obstacle outside the front field of view, and the reference number 1402 represents the virtual image of the mark generated for the warning on the obstacle.

The obstacle 1401 is determined such that the risk level is not 0 based on the advancing direction and the speed of the obstacle and the speed of the vehicle. Therefore, the mark 1402 is displayed to be flickered at a position near the obstacle 1401 as an arrow facing from the left to the right. In addition, the warning sound is output from the left speaker 109L. Since the driver 102 can recognize the obstacle outside the front field of view by the mark having a direction and the warning sound, the driver can take an action for avoiding the risk in advance, so that the safety in the driving can be increased.

Further, in this embodiment, the description has been made about the configuration in which the warning mark is always displayed and the warning sound is always output unless the risk level of the obstacle outside the front field of view is 0. However, the risk level may be provided in stages, and the warning mark may be displayed and the warning sound may be output in a case where the risk level is equal to or more than a predetermined risk level, or the size and the shape of the mark and the volume level of the warning sound may be changed according to the risk level. In addition, the stage of the risk level for the warning mark display may be set to be different from that of the risk level for outputting the warning sound, so that the mark display is performed in advance, and the warning sound may be output only in a case where the risk level is very high. In addition, the description has been made about a case where the warning mark is displayed as an arrow, but the shape is not particularly limited as long as the driver can recognize the shape. Furthermore, in this embodiment, not only the effect that the safety is improved in a case where the vehicle drives straight, but also the effect that the vehicle avoids involving in the obstacle at the time of turning right and left by using the information from the side camera can be achieved.

As described above, according to the fifth embodiment of the invention, it is possible to provide an information display system with a high safety which can make the driver recognize the obstacle outside the field of view in advance by localizing the sound and the image of the obstacle outside the front field of view and performing the mark display and the warning sound output.

Sixth Embodiment

Next, a sixth embodiment of the information display system according to the invention will be described using FIG. 15. This embodiment can be combined with any one of the embodiments described above, and the case combined with the first embodiment will be described herein for the sake of explanation. Further, regarding the descriptions where the configuration and the operation flow of the information display system are not particularly described, these descriptions are assumed to be equal to the first embodiment.

Figure 15:
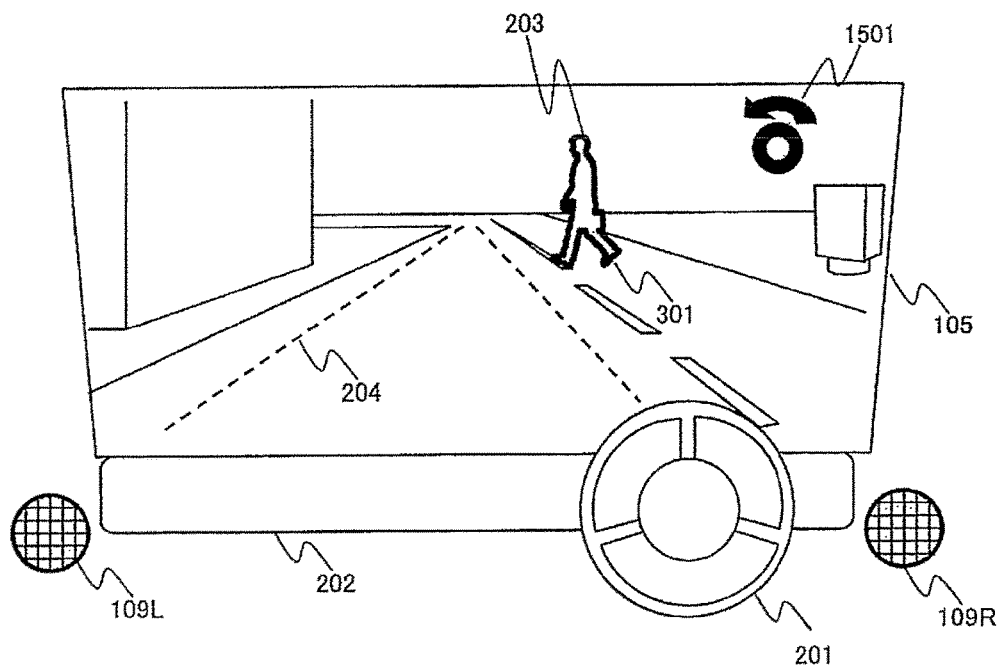
FIG. 15 is a diagram illustrating an example of a virtual image display of an action instructing mark in a sixth embodiment.

FIG. 15 illustrates the front scene which is projected on the combiner 105 and viewed by the driver 102 based on the processes according to this embodiment. The components used in FIG. 3 will be denoted by the same symbols, and the detailed description will not be repeated. The reference number 1501 represents the virtual image of the mark indicating an action command to the driver 102. In a case where the risk level of the obstacle 203 corresponds to (2) A≥D>B or (1) D>A, the virtual image 301 is displayed, and the image processing unit 115 generates the mark indicating the action command to the driver 102 as the virtual image, and displays the virtual image in the combiner 105 by the projection unit 103. Herein, according to the position with respect to the estimated vehicle traffic line 204 of the obstacle 203, the mark of the action command urging the driver to turn the steering to the left direction is displayed as the virtual image 1501. In a case where the risk level of the obstacle is high, the driver 102 recognizes the obstacle and can intuitively recognize the action command as the mark, so that the safety in the driving can be increased.

Further, the shape of the virtual image 1501 in this embodiment is not particularly limited, and any shape may be used as long as the driver can intuitively recognize the shape. In addition, the content of the action command is not limited to the turning of the steering, a plurality of actions such as braking and sounding a horn can be set, and the shape of the mark displayed as the virtual image 1501 can be changed according to the content. In addition, the display position of the virtual image 1501 is not particular limited, and can be changed according to circumstances such that the driver can easily recognize the virtual image and the position of the obstacle 203 is not disturbed. Furthermore, the virtual image 1501 may be displayed to be flickered according to the risk level of the obstacle 203.

As described above, according to the sixth embodiment of the present invention, it is possible to provide an information display system with a high safety by displaying the mark indicating the action command to the driver as the virtual image in a case where the risk level of the obstacle is high.

In all the embodiments of the present invention described above, the description has been made in some cases such that the processes are branched when the risk level is a predetermined threshold, but the process branched in a stage based on the risk level is not particularly limited to a predetermined value. In addition, the description has been made about a case where the outline and the frame line of the obstacle are displayed by the lower half in a case where the risk level of the obstacle is a predetermined value, but the size is not particularly limited, but may be changed in a range where the driver is not bothered from the recognition. In addition, the description has been made about a method of notifying the driver by using the virtual image and the warning sound in a case where the risk level of the obstacle is high, but the vehicle may be controlled for the braking together with the notification in a case where the risk level is high. Furthermore, in the display example of the front scene, the description has been made about a case where the estimated vehicle traffic line is always displayed, but the estimated vehicle traffic line is not necessarily displayed, and may be switched for displaying/non-displaying by an instruction of the driver. Furthermore, in the embodiment described above, there is no particular description about the display of a vehicle on the opposite lane, but in a case where the recognized vehicle on the opposite lane is also related to the estimated vehicle traffic line, the warning display and the warning sound may be output similarly to the other obstacles.

In addition, the invention is not limited to the embodiments described above, and includes various modification examples. For example, the embodiments are described in detail to help easy understanding of the invention, and the invention is not necessarily limited to a case where all the configurations are provided. Furthermore, some or all of the functions and the processing units may be realized in predetermined hardware, or may be realized in software such that a program for realizing the functions is interpreted and executed in an ECU (Electronic Control Unit).

REFERENCE SIGNS LIST 101 vehicle
102 driver
103 projection unit
104 mirror
105 combiner
106 virtual image plane
107 front camera
108 driver camera
109, 109L, and 109R speaker
110 each in-vehicle sensor
111 obstacle determination unit
112 risk level determination unit
113 viewpoint position determination unit
114 display position adjusting unit
115 image processing unit
116 sound processing unit
201 steering
202 instrument panel
203, 701 obstacle (pedestrian)
204, 1202 virtual image indicating estimated vehicle traffic line
205, 301, 501, 601, 702, 801, 901, and 1201 virtual image of obstacle
802, 902 virtual image indicating estimated traffic line of obstacle
1401 obstacle (automobile) outside front field of view
1402 virtual image indicating warning mark
1501 virtual image indicating action command

The invention claimed is:

1. An information display system that notifies driving support information to a driver, the information display system comprising:
an ECU including an image processor;
a display including a screen, and communicatively coupled to the image processor; and
a sensor that acquires information in front of the vehicle, the ECU is communicatively coupled to the sensor and determines an obstacle utilizing the acquired information, and
the image processor generates an estimated traffic line indicating a future-estimated advancing direction of the obstacle as a virtual image based on determination information of the obstacle, and the display displays the generated virtual image on the screen so as to be overlapped with the obstacle at a position of the estimated traffic line.

2. The information display system according to claim 1, wherein the determination information of the obstacle includes advancing direction information of the obstacle, and
a traffic line length of the virtual image of the estimated traffic line of the obstacle is changed according to the advancing direction information.

3. The information display system according to claim 1, wherein the virtual image of the estimated traffic line of the obstacle is one or more marks.

4. The information display system according to claim 1, wherein the ECU is further configured to determine a risk level of the obstacle by the determination information of the obstacle and a vehicle status, and
the image processor generates the virtual image of the estimated traffic line of the obstacle and the virtual image related to the obstacle according to the risk level by switching between a state in which an entire outline of the obstacle is displayed and a state in which a partial outline of the obstacle is displayed, and the display displays the virtual image of the estimated traffic line of the obstacle, and displays the virtual image related to the obstacle on the screen so as to be overlapped with the obstacle.

5. The information display system according to claim 1, wherein the image processor further generates the estimated traffic line as the virtual image according to the vehicle status, and the display displays the virtual image of the estimated traffic line on the screen.

6. The information display system according to claim 1, wherein in a case where a factor causing a low visibility is detected in front of the vehicle based on information acquired by the sensor, a luminance of the virtual image generated in the image processor is changed, or a portion other than the virtual image is generated as a modified virtual image for reducing the factor causing the low visibility, and the generated modified virtual image is displayed on the screen by the display.

7. An information display system that notifies driving support information to a driver, the information display system comprising:
an ECU including an image processor;
a display including a screen, and communicatively coupled to the image processor;
a sensor that acquires information in front of the vehicle, wherein the ECU is communicatively coupled to the sensor, determines an obstacle utilizing the acquired information and
determines a risk level of the obstacle based on determination information of the obstacle and a vehicle status, and
in a case where the obstacle is outside a front field of view of the vehicle, the image processor generates a virtual image as a mark indicating a presence of the obstacle according to the risk level, and the display displays the generated virtual image on the screen so as to be positioned in a direction near the obstacle.

8. The information display system according to claim 7, further comprising:
a sound processor that generates sound information;
a first speaker that is provided on a left side of the vehicle to output the sound based on the generated sound information; and
a second speaker that is provided on a right side of the vehicle to output the sound based on the generated sound information, wherein when the display displays the virtual image as the mark, the sound processor generates warning sound information as the sound information, in a case where the obstacle is outside the front field of view of the vehicle in a left direction, the sound based on the warning sound information is output from the first speaker, and in a case where the obstacle is outside the front field of view of the vehicle in a right direction, the sound based on the warning sound information is output from the second speaker.

9. An information display system that notifies driving support information to a driver, the information display system comprising:

an ECU including an image processor;

a display including a front screen, and communicatively coupled to the image processor; and a sensor that acquires information in front of the vehicle, wherein the ECU is communicatively coupled to the sensor, determines an obstacle by the acquired information and determines a risk level of the obstacle based on determination information of the obstacle and a vehicle status, the image processor generates a first virtual image indicating an outline related to the obstacle by switching between a state of displaying the entire outline of the obstacle and a state of displaying the partial outline of the obstacle according to the risk level, and further generates a second virtual image indicating an estimated traffic line of the obstacle based on the determination information of the obstacle, the estimated traffic line indicated by the second virtual image is generated based on an advancing direction and an estimated speed of the obstacle, the display displays the first virtual image on the front screen so as to be superimposed with the obstacle, and further displays the second virtual image on the front screen so as not to be superimposed with the obstacle but to be superimposed with a position of the estimated traffic line of the obstacle, and in a state where the first virtual image indicates the partial outline of the obstacle, the display further displays the first virtual image and the second virtual image on the front screen, the first virtual image being enlarged in comparison with a direction away from the estimated traffic line when the advancing direction of the obstacle is a direction of coming near the estimated traffic line of the vehicle.

10. The information display system according to claim 9, wherein the determination information of the obstacle includes the advancing direction of the obstacle, and a traffic line length of the second virtual image is changed depending on whether the advancing direction is a direction of coming near or away from the estimated traffic line of the vehicle estimated based on a vehicle status.

11. The information display system according to claim 10, wherein the traffic line length of the second obstacle is indicated by an increase or decrease in a number of predetermined marks.

12. The information display system according to claim 9, wherein the image processor generates the first and second virtual images related to the obstacle so as to indicate the entire outline of the obstacle at the high risk level or the partial outline of the obstacle at the low risk level.

* * * * *